Patented Aug. 9, 1938

2,126,179

UNITED STATES PATENT OFFICE 2,126,179

LIGHT STABILIZATION OF VINYL POLYMERS

Fred W. Duggan, Lakewood, Ohio, assignor, by mesne assignments, to Union Carbide and Carbon Corporation, a corporation of New York No Drawing. Application July 31, 1934, Serial No. 737,778

18 Claims. (Cl. 260—2)

The present invention relates to stable vinyl resins which are highly resistant to deterioration under the action of light. It includes also a method for the production of these stabilized resins. The invention has especial utility in the production of light-stable, or both heat-stable and light-stable vinyl resins produced by the polymerization of a vinyl halide, or by the conjoint polymerization of mixtures of vinyl halides with other polymerizable vinyl compounds, such as vinyl esters of aliphatic acids.

It is commonly known that resinous polymerization products formed from vinyl compounds undergo certain changes when exposed to light and heat. These changes may result in the loss by the resin of such important properties as its strength, elasticity and electric-insulating capacity. Furthermore, the resin gradually discolors upon exposure to light, or to light and heat, thus rendering it unsuitable for certain important technical uses.

Methods are already known for treating such polymerization products to stabilize them against decomposition upon exposure to heat for a long period under conditions where there exists a tendency for the polymerization products to split off free hydrogen chloride under the action of heat. In certain instances the heat-stabilizing agent employed also has improved the light-stability of the resins.

Many basic heat-stabilizing compounds are somewhat limited in their utility by the fact that when used in amounts sufficient to stabilize the resin also against deterioration by light, a more or less deep color, or a slight fog or cloud develops in the stabilized resin and renders the latter objectionable for many purposes.

The present invention is based in part upon the discovery that it is possible to treat an unstabilized vinyl resin, or one that has been stabilized against heat, so as further to stabilize the resin against deterioration and discoloration upon exposure to light, whether from a natural or artificial source, while preventing or substantially retarding the formation in the resin of objectionable fog or color.

Among the more important objects of the present invention are: To provide a novel heat-stable and light-stable light-colored polymerization product; and to provide in novel manner for the production of a stable resinous polymerization product that is highly resistant to the action of light and heat.

In accordance with one form of this invention, the resin or polymerization product to be rendered stable toward light, or toward both light and heat, is treated with a small amount of an organic compound, preferably phenol, or those benzene and phenol derivatives wherein a nitro, hydroxy, alkyl, aryl, alkoxy, carbalkoxy or ester group is attached to an aromatic nucleus. The resin may be treated concurrently or prior thereto with a heat-stabilizing agent, such as strontium oleate, lead oleate, or other suitable soap or salt of a weak organic acid having a metallic radical selected from the group consisting of the alkali metals, the alkaline earth metals, cadmium, lead and manganese, as disclosed in the copending patent application of Frazier Groff and Marion C. Reed, Serial No. 734,508 filed July 10, 1934 for "Stabilization of vinyl resins and compositions produced thereby," now matured in U. S. Patent No. 2,075,543, issued Mar. 30, 1937.

In general, compounds containing the above-mentioned groups have been found to be particularly effective when two dissimilar groups are attached to the benzene nucleus, as in the case of eugenol and thymol, and especially when these groups are in the ortho position.

While one hydroxyl or one methoxy group alone on the benzene ring produces a good light-stabilizing agent, such as in the case of phenol and anisole, yet if a nitro, aryl, methoxy, methyl, carbalkoxy or ester group is placed ortho to an hydroxyl group, the resultant compound serves still more effectively to stabilize vinyl resins against the action of light. Thus, methyl salicylate imparts better light stability than anisole (methyl phenyl ether). Guaiacol, o-phenyl phenol, and o-cresol also are good stabilizing agents for these resins.

Benzene derivatives containing a single nitro group ortho to a hydroxyl group, such as o-nitrophenol,—or ortho to an amino group, as in o-nitraniline,—are excellent stabilizers for these resinous polymerization products.

Most nitro compounds are originally too highly colored for satisfactory use excepting in instances where such color itself is not objectionable. Similarly the property possessed by most amino compounds and many other compounds of themselves discoloring on exposure to light, heat, or air by formation of colored oxidation products, further limits the field of useful light-stabilizers. This is particularly true in the case of aromatic amines, especially when the nitrogen is attached directly to the benzene ring.

Benzene- and phenol-derivatives containing one or more ester groups attached to the benzene ring in many instances possess outstanding merit as light-stabilizing agents for vinyl polymerization products. Among such esters may be mentioned methyl salicylate, butyl salicylate, triethylene glycol disalicylate, ethylene glycol monobutyl ether salicylate, ethylene glycol phthalate, ethylbutyl phthalate, ethylhexyl phthalate, ethylene glycol monobutyl ether phthalate, tricresyl phosphate, and tricresyltrithiophosphate. Glycerol phthalate resins, shellac, pine oil, and other substances containing esters of the type indicated are also suitable as light-stabilizers.

In the preferred practice of the invention, the stabilizing compound, or a mixture of two or more thereof, is incorporated with the resin or polymerization product in amounts which may vary within the range from 1% to 5% or more, depending upon such factors as the stabilizer, the chemical stability of the material to be stabilized, and the use to which it is to be placed. The degree of resistance to discoloration by light imparted to a resin or polymerization product by a stabilizer according to the invention varies more or less directly with the amount of stabilizer used.

The compound may be milled into the resin on a differential roll mill, preferably at temperatures around 105°–110° C. or below, for a period sufficient to provide an intimate mixture of the resin and light-stabilizer. There may be added to the mixture on the mill, if desired, a small amount, generally around 1%, of a compound adapted to stabilize the polymerization product against physical deterioration by the action of heat. Strontium oleate is an example of such heat-stabilizing agent. Its presence assists in keeping the product colorless and clear.

The invention is illustrated by the following example:

To 100 parts by weight of a vinyl resin produced by the conjoint polymerization of a mixture of about 75% vinyl chloride and about 25% vinyl acetate there was added 1 part of strontium oleate and 2.5 parts of butyl salicylate. The mixture was milled for 10 minutes at 110° C. on a differential roll mill. A portion of the milled mass, when dissolved in acetone, gave a solution which was nearly neutral to neutral red. The resultant product was outstanding for its lack of color and its stability to heat and resistance to discoloration upon prolonged exposure to sunlight and to ultra-violet light.

Methyl salicylate may be substituted for the butyl salicylate with equally good results, but the methyl ester is more difficult to mix on the mill due to its greater volatility.

Where difficulties arise in milling the light-stabilizing compound directly into the material to be stabilized, the solid or liquid stabilizing compound may be dissolved in a suitable solvent and mixed with the said material, after which the material and stabilizing compound are concurrently precipitated and this mixture then milled. In one instance pine oil, the stabilizing agent, was added to an acetone solution of a resin produced by the conjoint polymerization of vinyl acetate and vinyl chloride. The resin and pine oil were then coprecipitated with water, and the precipitate was washed with water and air dried. The resultant product was then milled in the manner described above.

The following illustrates another method for incorporating the light stabilizer into the vinyl resin. Orthonitrophenol was dissolved in an acetone solution of a vinyl resin similar to that described in the last-named specific example. A film or coating of the resultant solution of stabilized resin was applied to a surface, and the solvent was then evaporated. No milling nor heating of the stabilized resin prior to use was required.

Preferably the organic compounds used as light-stabilizing agents in accordance with the invention are either neutral or even somewhat basic. Where the material being stabilized is known to be of a type that rapidly becomes acidic upon exposure to heat and light, a corresponding greater proportion of the heat-stabilizer should be employed, or basic materials are added to neutralize any acid as formed.

The use of certain organic esters for plasticizing vinyl resins and other resinous compositions is well known. In such instances the plasticizer or modifying agent generally has been used in considerable amount for the purpose. Many of these esters, such as dibutyl phthalate, heretofore widely used as a plasticizer, have been found to produce no light-stabilizing effect upon vinyl resins exposed to sunlight; and in some instances, they actually have increased the rate of resin discoloration.

On the other hand, many of the light-stabilizing agents of the present invention may be mixed with or milled into the vinyl resins in amount sufficient to permit them to function effectively as plasticizers, softeners or modifying agents for the said resin, without injuriously affecting their stabilizing action. Among these compounds may be mentioned butyl salicylate and beta-butoxyethyl salicylate.

This invention facilitates the production of transparent laminated structures which are resistant to discoloration by light. Laminated glass structures formed of a plurality of sheets of glass and an interposed adherent layer or layers of a polymerization product of a vinyl compound stabilized in accordance with this invention are shatterproof and strong, yet are highly resistant to discoloration under the effect of sunlight.

The term "vinyl resin" as used in the accompanying claims, is intended to designate a resinous polymerization product of at least one vinyl compound, including a vinyl halide.

The invention is susceptible of modifications, and such modifications are included within the scope of the invention as defined by the appended claims.

I claim:

1. The process of stabilizing a vinyl resin against discoloration by light, which comprises intimately mixing with the former a small amount of a light-stabilizing phenol derivative having a single hydroxyl group and having an alkyl-substituted carboxyl group placed ortho to the hydroxyl group.

2. The process of stabilizing a vinyl resin formed by the polymerization of at least one vinyl compound including a vinyl halide against discloration by light, which comprises intimately mixing with the former a small amount of a light-stabilizing alkyl ester of salicylic acid.

3. A light-stable resinous composition, which comprises a vinyl resin formed by polymerization of at least one vinyl compound including a vinyl halide, and having intimately mixed therewith a small amount of a light-stabilizing phenol derivative having a single hydroxyl group, and having an alkyl-substituted carboxyl group placed ortho to the latter.

4. A light-stable resinous composition, which comprises a vinyl resin formed by polymerization of at least one vinyl compound including a vinyl halide, and having intimately mixed therewith a small amount of an alkyl ester of salicylic acid.

5. A light-stable resinous composition, which comprises a vinyl resin formed by polymerization of at least one vinyl compound including a vinyl halide, and having intimately mixed therewith a small amount of the butyl ester of salicylic acid.

6. The process of stabilizing a vinyl resin formed by the polymerization of at least one vinyl compound including a vinyl halide against discoloration by light, which comprises intimately mixing with said resin a small amount of a light-stabilizing benzene derivative having a single hydroxyl group directly connected to the benzene nucleus and having a substituted carboxyl group placed ortho to the hydroxyl group.

7. The process of stabilizing a vinyl resin formed by the polymerization of at least one vinyl compound including a vinyl halide against discoloration by light, which comprises intimately mixing a small amount of a salicylic acid ester with said resin.

8. A light-stable polymerization product derived from at least one vinyl compound selected from the group consisting of vinyl halides and mixtures of vinyl halides with other polymerizable vinyl compounds, which product has intimately mixed therewith a small amount of a light-stabilizing benzene derivative having a single hydroxyl group directly connected with the benzene nucleus, and having a substituted carboxyl group ortho to the latter.

9. A light-stable polymerization product derived from at least one vinyl compound selected from the group consisting of vinyl halides and mixtures of vinyl halides with other polymerizable vinyl compounds, which product has intimately mixed therewith a small amount of a salicylic acid ester.

10. A light-stable polymerization product derived from at least one vinyl compound selected from the group consisting of vinyl halides and mixtures of vinyl halides with other polymerizable vinyl compounds, which product has intimately mixed therewith a small amount of methyl salicylate.

11. A light-stable polymerization product derived from at least one vinyl compound selected from the group consisting of vinyl halides and mixtures of vinyl halides with other polymerizable vinyl compounds, which product has intimately mixed therewith a small amount of β butoxyethyl salicylate.

12. The process of stabilizing a vinyl resin formed by the polymerization of at least one vinyl compound including a vinyl halide against discoloration by light, which comprises intimately mixing with the former a small amount of butyl salicylate.

13. The process of stabilizing a vinyl resin formed by the polymerization of at least one vinyl compound including a vinyl halide against discoloration by light, which comprises intimately mixing with the former a small amount of methyl salicylate.

14. The process of stabilizing a vinyl resin formed by the polymerization of at least one vinyl compound including a vinyl halide against discoloration by light, which comprises intimately mixing with the former a small amount of β butoxyethyl salicylate.

15. The process of stabilizing a vinyl resin formed by the polymerization of at least one vinyl compound including a vinyl halide against discoloration by light, which comprises mixing with a solution of the vinyl resin in a solvent therefor, a small amount of a stabilizing compound soluble in the said solvent and selected from the group consisting of phenol, o-nitrophenol, guaiacol, o-cresol, organic salicylates and disalicylates, o-nitraniline, and anisole, coprecipitating the said resin and compound from the resultant solution, and recovering and milling the thus precipitated intimate mixture of vinyl resin and stabilizing compound.

16. The process of stabilizing against discoloration by light a vinyl resin formed by the polymerization of at least one vinyl compound including a vinyl halide, and which resin is both heat-sensitive and discolorable upon exposure to light, which comprises incorporating into the said resin, in the presence of a compound stabilizing the resin against deterioration by heat, not substantially more than 5% of a compound selected from the group consisting of phenol, o-nitrophenol, guaiacol, o-cresol, organic salicylates and disalicylates, o-nitraniline, and anisole, but in amount sufficient to inhibit in the stabilized resin substantial change in color by the action of light.

17. The process of stabilizing against discoloration by light a vinyl resin formed by the polymerization of at least one vinyl compound including a vinyl halide, which resin is both heat-sensitive and discolorable upon exposure to light, which comprises milling the said resin, in the presence of a compound stabilizing the resin against deterioration by the action of heat, with a small amount of a compound stabilizing the resin against discoloration by light, the last-named compound being selected from the group consisting of phenol, o-nitrophenol, guaiacol, o-cresol, organic salicylates and disalicylates, o-nitraniline, and anisole, the last-named compound being present in amount sufficient to inhibit in the final product substantial change in the color thereof by the action of light.

18. The process of stabilizing against discoloration by light a vinyl resin formed by the polymerization of at least one vinyl compound including a vinyl halide, which resin is both heat-sensitive and discolorable upon exposure to light, which comprises mixing with a solution of the vinyl resin in a volatile solvent therefor, in the presence of a compound stabilizing the resin against deterioration by the action of heat, a small amount of a compound soluble in the said solvent and selected from the group consisting of phenol, o-nitrophenol, guaiacol, o-cresol, organic salicylates and disalicylates, o-nitraniline, and anisole, the last-named compound being present in amount sufficient to inhibit in the final product substantial change in the color thereof by the action of light, forming a thin surface layer of the resultant solution, and thereafter removing the solvent from the said layer.

FRED W. DUGGAN.